(12) United States Patent
Jayaram et al.

(10) Patent No.: US 11,829,344 B2
(45) Date of Patent: Nov. 28, 2023

(54) SYSTEM FOR MANAGING DATA

(71) Applicants: Sanjay Jayaram, Bangalore (IN); Raghuram Bk, Bangalore (IN)

(72) Inventors: Sanjay Jayaram, Bangalore (IN); Raghuram Bk, Bangalore (IN)

( * ) Notice: Subject to any disclaimer, the term of this patent is extended or adjusted under 35 U.S.C. 154(b) by 238 days.

(21) Appl. No.: 17/082,014

(22) Filed: Oct. 28, 2020

(65) Prior Publication Data

US 2021/0073205 A1 Mar. 11, 2021

Related U.S. Application Data

(63) Continuation of application No. 15/484,159, filed on Apr. 11, 2017, now Pat. No. 10,860,572.

(30) Foreign Application Priority Data

Oct. 20, 2015 (IN) ............................ 5638/CHE/2015

(51) Int. Cl.
*G06F 16/23* (2019.01)
*G06F 16/25* (2019.01)
*G06F 16/22* (2019.01)
*G06F 16/901* (2019.01)
*H04L 9/32* (2006.01)
*G06F 21/62* (2013.01)

(52) U.S. Cl.
CPC ...... *G06F 16/2365* (2019.01); *G06F 16/2255* (2019.01); *G06F 16/258* (2019.01); *G06F 16/9014* (2019.01); *G06F 21/6218* (2013.01); *H04L 9/3239* (2013.01)

(58) Field of Classification Search
CPC ............. G06F 16/2365; G06F 16/2255; G06F 16/258; G06F 16/9014; G06F 21/6218; H04L 9/3239
USPC ........................................................ 707/698
See application file for complete search history.

(56) References Cited

U.S. PATENT DOCUMENTS

| | | | |
|---|---|---|---|
| 7,103,602 B2* | 9/2006 | Black ...................... | G06F 16/10 707/827 |
| 7,734,598 B2* | 6/2010 | Noguchi .......... | G11B 20/00086 713/168 |
| 7,797,323 B1* | 9/2010 | Eshghi ................ | G06F 16/1748 707/747 |
| 7,933,905 B2* | 4/2011 | Obana ................... | H04L 9/0838 711/216 |
| 9,537,771 B2* | 1/2017 | Arad ...................... | G06F 16/245 |
| 9,959,280 B1* | 5/2018 | Whitehead .............. | G06F 16/13 |
| 11,023,453 B2* | 6/2021 | Kimura ............... | G06F 12/0238 |
| 11,379,580 B1* | 7/2022 | Wesselkamper ....... | G11C 17/18 |
| 11,436,195 B2* | 9/2022 | Maybee .................. | G06F 11/14 |

(Continued)

*Primary Examiner* — Sheree N Brown

(57) ABSTRACT

A system (100) for managing data is provided. The system includes at least one processor (102) configured to convert a source dataset (302) to a root dataset (312) by obtaining a plurality of intermediary datasets (306, 308). The root dataset (312) is shorter compared to the source dataset (302) and the intermediary datasets (306, 308) are intermediate to the source dataset (302) and the root dataset (312). At least one of the intermediary datasets comprises reference bits, wherein the reference bits enable identification of one or more functions that should be used to obtain a dataset from which the intermediary dataset comprising the reference bits was obtained in the process of converting the source dataset (302) and the root dataset (312).

12 Claims, 8 Drawing Sheets

(56) References Cited

U.S. PATENT DOCUMENTS

| | | | |
|---|---|---|---|
| 11,436,344 B1* | 9/2022 | Juch | G06F 21/602 |
| 11,436,692 B2* | 9/2022 | Manamohan | G06N 20/00 |
| 2004/0060003 A1* | 3/2004 | Mani | G06F 40/154 |
| | | | 715/234 |
| 2007/0245119 A1* | 10/2007 | Hoppe | H04L 45/7453 |
| | | | 707/E17.025 |
| 2008/0034021 A1* | 2/2008 | De Spiegeleer | G06F 11/1453 |
| 2009/0228685 A1* | 9/2009 | Wei | G06F 16/2465 |
| | | | 707/999.005 |
| 2010/0031000 A1* | 2/2010 | Flynn | G06F 16/9014 |
| | | | 711/216 |
| 2011/0099175 A1* | 4/2011 | Darcy | G06F 16/9014 |
| | | | 707/747 |
| 2011/0293087 A1* | 12/2011 | Tagashira | H04L 9/0866 |
| | | | 380/28 |
| 2011/0313979 A1* | 12/2011 | Roberts | G06F 16/24565 |
| | | | 707/690 |
| 2012/0158709 A1* | 6/2012 | Gaonkar | G06F 16/1748 |
| | | | 707/723 |
| 2013/0054969 A1* | 2/2013 | Charles | H04L 9/3271 |
| | | | 713/169 |
| 2015/0058353 A1* | 2/2015 | Sorkin | G06F 16/278 |
| | | | 707/771 |
| 2015/0207789 A1* | 7/2015 | Kumar | H04L 63/08 |
| | | | 726/6 |
| 2015/0220684 A1* | 8/2015 | Greenfield | G16B 5/20 |
| | | | 707/722 |
| 2015/0286844 A1* | 10/2015 | Mosko | H04L 67/63 |
| | | | 713/167 |
| 2015/0288754 A1* | 10/2015 | Mosko | H04L 67/1095 |
| | | | 709/248 |
| 2015/0288755 A1* | 10/2015 | Mosko | H04L 67/63 |
| | | | 709/248 |
| 2018/0011893 A1* | 1/2018 | Kimura | G06F 16/283 |
| 2021/0303722 A1* | 9/2021 | Donohoe | H04L 9/006 |
| 2022/0188757 A1* | 6/2022 | Morris | G06F 18/214 |

* cited by examiner

SYSTEM FOR MANAGING DATA

CROSS REFERENCE TO RELATED APPLICATION

This application is a continuation application of U.S. patent application Ser. No. 15/510,241 filed on Mar. 10, 2017 entitled SYSTEM FOR MANAGING DATA, which is hereby incorporated herein by reference. Benefits of priorities to all related applications are claimed.

BACKGROUND

Unless otherwise indicated herein, the materials described in this section are not prior art to the claims in this application and are not admitted to be prior art by inclusion in this section.

FIELD

The subject matter in general relates to data storage and management. More particularly, but not exclusively, the subject matter is directed to collision resistant condensation of arbitrarily large datasets and reconstruction of condensed dataset.

DISCUSSION OF RELATED ART

Adding to the data explosion of the past few decades from the exponential growth of unstructured and rich media content, the looming Internet of Things presents a new challenge that exacerbates the already significant problem of data storage and management. Binary electronic data is now everywhere, and growing. In the absence of new thinking, over the next several decades, data growth and data retention will not only become impractical using current methods and systems, but will likely also, present as significant an ecological problem, as the consumption of oil has presented, over the past several decades. Here, some key questions need immediate addressing: Is limitless data growth inevitable? Is it conceivable to control data bloat, without compromising growth of information and knowledge? With so much data already "out there", is "new" data really necessary? And, most importantly, can a system be designed to use common data elements, and yet, deliver complete privacy and security?

We do know that all data representation is built upon the aggregation and combination of a finite set of immutable elements. In the case of binary data, at its lowest level, these immutable elements are the two binary digits 0 and 1—the "sub-atomic particles" of binary data, which, when combined together in groups of n" particles", can yield unique "data-atoms" or "data-elements" corresponding to the function $2^n$. Might it then be possible, within any new dataset, or within the universe of existing datasets comprising the "sub-atomic particles" 0 and 1, to identify and create a larger set of "data-elements" that can serve as higher order immutable building blocks or as a "periodic table of binary data elements" in a new data representation model?

Current implementations of data storage and retrieval systems store data in a form that is both context and content "heavy"; i.e., the actual constituting content of a dataset and the associated metadata for retrieval fidelity—the semantic mass, are embodied into the payload of a dataset. Recent implementations also employ techniques to shard and distribute the contents of a dataset into a number of constituent parts, requiring a threshold number of parts for semantically faithful reconstitution of the original content. Both systems may also use further optimization and security techniques including, but not limited to compression, deduplication, encryption etc.

However, these and other current approaches still suffer from the core problems of non-algorithmic content mutation and semantics-embodiment, with consequent repercussions and limitations relating to data content integrity, data security, data privacy, access-specificity, data transmission, data footprint efficiency and data archival.

To be sure, a dataset, to be useful, must provide both content and context. At the same time, this "embodiment" of content and context within a dataset, is at the core of the problems and limitations of current data storage systems.

Attempting to address data integrity, reliability and security, using models that retain the tight coupling between semantics and content must inevitably therefore, suffer from some or all of the following constraints: i. Non-algorithmic representation, ii. Inability to provide guaranteed data content-integrity; iii. Limited Footprint/capacity-optimization; iv. Impractical and inefficient to deliver universal device-agnostic and location-agnostic "anywhere" data access; v. Semantics embodiment, and intrinsic vulnerability to security breaches; vi. Data transmission inefficiency, especially across wide area networks and/or bandwidth-constrained links; and vii. Impractability and unviability to store and secure binary data in a non-binary non-electronic form.

The systems and methods disclosed address the above motivational questions, and provide the framework for the implementation of a unique new system of data representation, in which any dataset of arbitrary size, may be viewed as a "unique molecule of data" made up of a combination of immutable higher order data elements, and re-represented in a data storage, retrieval and transmission system of algorithmically-defined data.

SUMMARY

An embodiment provides a system for managing data. The system includes at least one processor configured to convert a source dataset to a root dataset by obtaining a plurality of intermediary datasets. The root dataset is shorter compared to the source dataset and the intermediary datasets are intermediate to the source dataset and the root dataset. At least one of the intermediary datasets comprises reference bits, wherein the reference bits enable identification of one or more functions that should be used to obtain a dataset from which the intermediary dataset comprising the reference bits was obtained in the process of converting the source dataset to the root dataset.

Another embodiment provides a system for managing data. The system includes at least one processor configured to convert a source dataset to a root dataset by obtaining a plurality of intermediary datasets. The root dataset includes reference bits, wherein the reference bits enable identification of a function that should be used to obtain at least an intermediary dataset of a higher order from which the root dataset was obtained during the conversion of the source dataset to the root dataset. The reference bits included in the root dataset enable identification of a number of intermediary datasets that have been derived to obtain the source dataset from the root dataset. The system further protects retrieval of the root dataset via one or more first authentication systems.

Another embodiment provides yet another system for managing data. The system includes at least a database and at least one processor. The database includes a plurality of hash values. The processor also stores, for each hash value, corresponding data string and data identifying function used for obtaining the hash value. The processor is configured to add to the database, a first hash value, data string corresponding to the first hash value and data identifying a first function used for computing the first hash value, if a combination of the first hash value and the first function is absent in the database.

The processor may be further configured to add to the database, a second hash value, data string corresponding to the first hash value and data identifying a second function, wherein, the second function may be used for computing the second hash value using the data string corresponding to the first hash value; and the second hash value may be unique compared to unique hash values, which are computed using the second function, present in the database.

In another aspect, the processor may be further configured to add to the database the second hash value, the data string corresponding to the first hash value and data identifying a second function, if the database already comprises the first hash value derived using the first function representing a first data string, wherein the first data string may be different from the data string corresponding to the first hash value, wherein the data string corresponding to the first hash value is being contemplated to be added to the database.

The processor may be further configured to receive the first hash value from a source system, provide access to the database to a plurality of client systems, which are discrete to the source system, for converting source datasets and root datasets.

The processor may be further configured to add to the database, the first hash value, the data string corresponding to the first hash value and the data identifying the first function, only if the first hash value, the data string and the first function correlate.

The processor may be further configured to add to the database, the first hash value, the data string corresponding to the first hash value and the data identifying the first function, by deriving the data string using the first hash value and the data identifying the first function.

The processor may be further configured to add to the database, a plurality of hash values derived based on a source data string of at least one of the hash values in the database, wherein, entry of at least one of the data strings corresponding to the derived hash values is absent in the database, and the derived hash value for which entry of corresponding data string is absent has an entry that enables deriving of the corresponding data string using the source data string.

In an aspect, the derived hash values that are added to the database are unique compared to the hash values present in the database that are derived using a same function, and data strings represented by the derived hash values that are added to the database are unique compared to the data strings already present in the database In an aspect, the data strings represented by the derived hash values that are added to the database are derived by reading the source data string by offsetting predefined bits in the source data string.

The processor may be further configured to add to the database, for one or more hash value, compressed form of corresponding data string.

The processor may be configured to communicate to a client system the data string in the compressed form.

The system may further include a local database in a source system, wherein the local database is remotely located with respect to the database and the local database is a subset of the database.

The system may further include a source system and a client system, wherein the database is present in the source system and the client system.

In an aspect, the system is configured to convert a source dataset to a root dataset and the database is unique with respect to the source dataset.

BRIEF DESCRIPTION OF THE DRAWINGS

Embodiments are illustrated by way of example and not limitation in the Figures of the accompanying drawings, in which like references indicate similar elements and in which.

DETAILED DESCRIPTION

Figure 1:
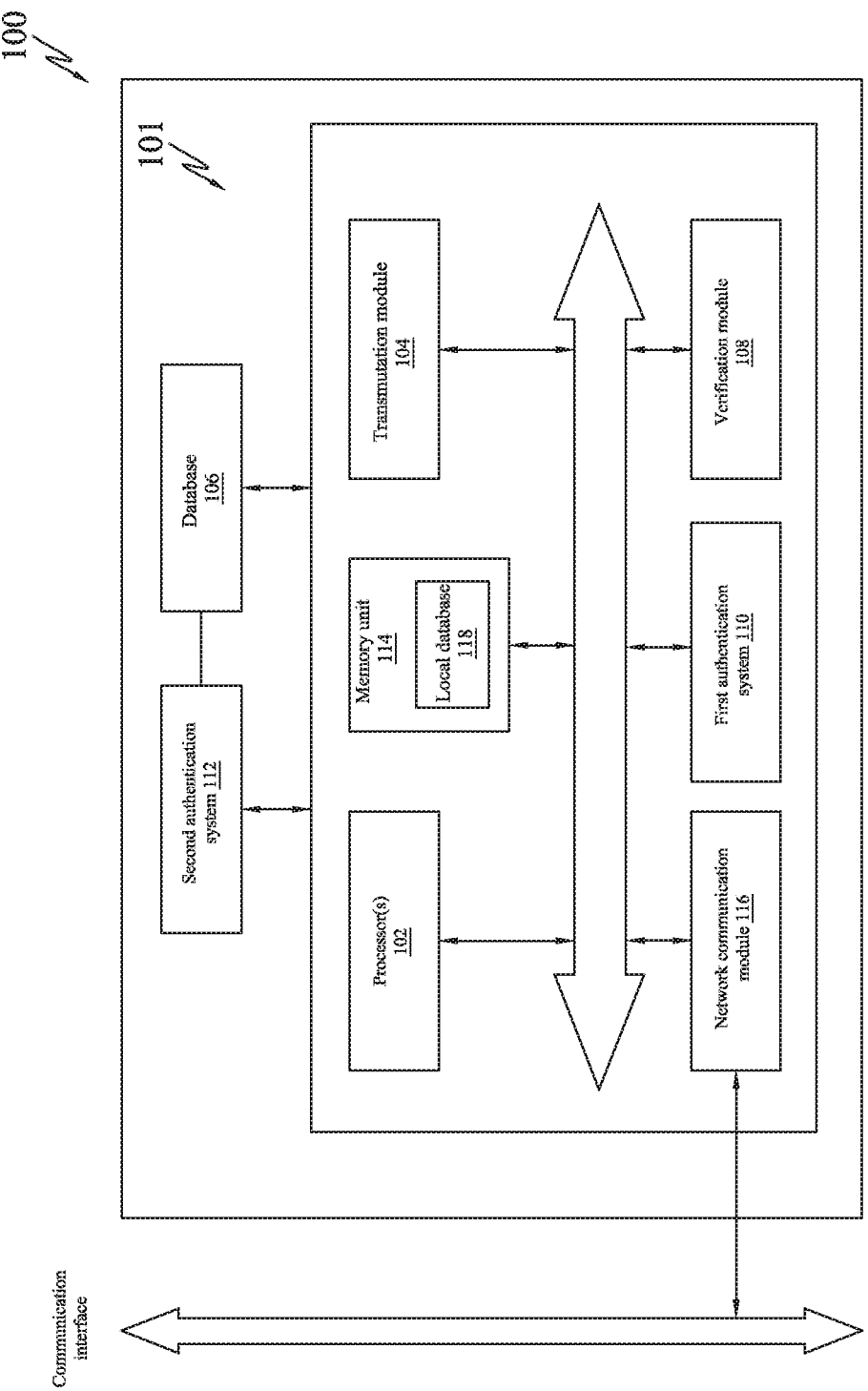
FIG. 1 is a block diagram of a system 100 for managing data.

I. OVERVIEW
II. SYSTEM FOR MANAGING DATA
III. CONVERSION OF SOURCE DATASET TO ROOT DATASET
IV. PROTECTION OF DATA
V. RECONSTRUCTION OF SOURCE DATASET
VI. MASTER DATABASE
VII. OPTIMIZATION OF THE MASTER DATABASE
VIII. FIRST ALTERNATE CONFIGURATION OF DATABASE
IX. SECOND ALTERNATE CONFIGURATION OF DATABASE
X. THIRD ALTERNATE CONFIGURATION OF DATABASE
XI. FOURTH ALTERNATE CONFIGURATION OF DATABASE
XII. FIFTH ALTERNATE CONFIGURATION OF DATABASE
XIII. CONCLUSION

The following detailed description includes references to the accompanying drawings, which form part of the detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

I. OVERVIEW

Embodiments provide a system for managing data. The system enables a source dataset of arbitrary length to be represented by a root dataset, preferably, but not necessarily of fixed length. The system also enables the source dataset to be reconstructed using the root dataset. The system also enables protection of the root dataset from unauthorized use, thereby enabling protection of the source dataset from unauthorized use. The system is configured to convert the source dataset to the root dataset by obtaining a plurality of intermediary datasets. The root dataset is shorter compared to the source dataset. The intermediary datasets, as the name suggest, are intermediate to the source dataset and the root dataset. The source dataset is an arbitrarily large dataset which is parsed at fixed width/length. Each of the plurality of parsed datasets of fixed width may be transmuted using hash functions to obtain hash value for each of the parsed dataset of fixed width. Hence, each intermediary dataset comprises hash values that are computed using the hash functions. Similarly, the root dataset preferably comprises one hash value, which is obtained by transmuting the immediately preceding intermediary dataset. It may be noted that each of the intermediary datasets may further comprise reference bits. These reference bits may be appended, prepended or interleaved to the hash values that form the respective intermediary dataset. The reference bits enable identification of hash functions that should be used to obtain an intermediary dataset (or source dataset as the case may be) of a higher order from an intermediary dataset of lower order. The root dataset may be the last dataset obtained in the process, beyond which no further transmutation would result in dataset of shorter length. The root dataset may comprise one hash value and reference bits. The reference bits may identify the function that should be used to obtain the intermediary datasets of immediate higher order using the hash value present in the root dataset. The reference bits of the root dataset may also identify the number of intermediary datasets which have to be derived to derive the source dataset. Hence, by protecting the root dataset from unauthorized use, the source dataset is protected. Further, the source dataset can be reconstructed by using the root dataset, which enables reconstruction of the intermediary datasets of immediate higher order using the hash function identified by the reference bits, and the number of intermediary datasets which have to be derived to derive the source dataset. In light of this number, and reference bits present in each of the intermediary datasets, intermediary datasets of higher order are reconstructed, to eventually obtain the source dataset. As mentioned earlier, the system enables protection of root dataset, thereby the source dataset, from unauthorized access. The system may enable storing of the root dataset in one or more authentication systems. The authentication systems may be within a source system, which initially had the source dataset. Alternatively, the authentication systems may be discrete from the source system. In an implementation, only the reference bits of the root dataset may be secured.

The reconstruction of the source dataset from the root dataset involves obtaining data strings corresponding to hash values, which are stored in a database in which these data strings and hash values are arranged in a manner that lack semantics with respect to the source dataset and the intermediary datasets. The database stores hash values, data strings corresponding to the hash values and reference bits identifying hash functions used for obtaining the hash values. The database may be built or expanded by adding hash values, reference bits that enable identification of functions used to compute the hash values and data strings corresponding to the hash values if they are not already present in the database. The system enables adding to the database a hash value, and its corresponding data string and hash function identifier (reference bits) if the hash value is not present in the database. The system further enables adding to the database a hash value, and its corresponding data string and hash function identifier, even if the hash value is same as a hash value that is already present in the database, as long as the hash value that is currently being added is derived from a hash function that is different from the hash function that was used to derive the matching hash value that is already present in the database. In a scenario wherein the hash value and its corresponding function are same as an already recorded hash value and its corresponding function, but representing two different data strings, the system enables generation of a new hash value and function combination, and adds it to the database. The database may be deployed on a cloud server. Alternatively, the database may be within the confines of the source system that had the source dataset.

II. SYSTEM FOR MANAGING DATA

Referring to the figures, more particularly to FIG. 1, an exemplary architecture of an exemplary system 100 for managing data is provided. In this section the system components/modules are discussed in brief. Detailed discussion of appropriate components/modules is included in the subsequent sections.

The system 100 includes a source system 101, a master database 106 and a second authentication system 112 associated with the master database 106. The source system 101 may include at least one processor 102, a transmutation module 104, a verification module 108, one or more first authentication systems 110, memory unit (s) 114 and network communication modules 116. System 100 may further include client systems. The architecture of the client systems may resemble that of the source system 101.

The source system 101 may be configured to convert a source dataset to a root dataset in co-ordination with the master database 106 and the second authentication system 112. Further, reconstruction of source dataset from the root dataset may also take place in the source system 101 or the client systems. The source system 101 or the client systems may be portable or non-portable. Examples of non-portable systems include, but not limited to, desktop computers and data centers. Examples of portable systems include, but not limited to, smart phones and laptops.

The processor 102, returns output by accepting signals, such as electrical signals as input. In one embodiment, the system 100 may include one or more processing units (CPUs). The processor(s) 102 may enable communication with other systems via network communication modules 116. The processor 102 may be implemented as appropriate in hardware, computer-executable instructions, firmware, or combinations thereof. Computer-executable instruction or firmware implementations of the processor 102 may include computer-executable or machine-executable instructions written in any suitable programming language to perform the various functions described.

Transmutation of larger datasets to obtain smaller datasets in the process of conversion of the source dataset to the root dataset may be carried out in the transmutation module 104.

The master database 106 may store a plurality of hash values, and for each hash value, corresponding data string and data identifying function (ex. reference bits) that are used for obtaining the hash value from the data string. The master database 106 may be deployed in a cloud server. The master database 106 may be remotely located from the source system 101.

The second authentication system 112 may prevent erroneous entries of hash values, data strings and hash function identifiers into the master database 106.

Verification module 108, present in the source system 101, may be configured to communicate with the master database 106. The verification module 108 may enable checking hash value, data strings and reference bits for collision within the master database 106.

The first authentication systems 110 may be configured to protect the root dataset from unauthorized access.

The memory units/devices 114 may store data and program instructions that are loadable and executable on processor 102 as well as data generated during the execution of these programs. The memory may be volatile, such as random access memory and/or a disk drive or non-volatile memory.

Local database 118 may be present in the memory units/device 114. Local database 118 may be a subset of the master database 106.

III. CONVERSION OF SOURCE DATASET TO ROOT DATASET

In an embodiment, the system 100 for managing data may be configured to convert a source dataset to a root dataset. The source dataset may be present in the source system 101 in its memory unit 114, which may be fetched by the processor 102 for conversion. The processor 102 may be configured to convert the source dataset to a root dataset by using functions. Example of such functions include, but are not limited to hash functions and modified Merkle function. The source dataset is transmuted to intermediary datasets of shorter length and each intermediary dataset is transmuted to further shorter intermediary datasets. Intermediary datasets may include hash values computed using the hash functions. The intermediary datasets are iteratively transmuted until a condensed root dataset is computed. The root dataset may be stored in an authentication system. The source dataset may be reconstructed from the root dataset by performing reverse transmutation.

Figure 2:
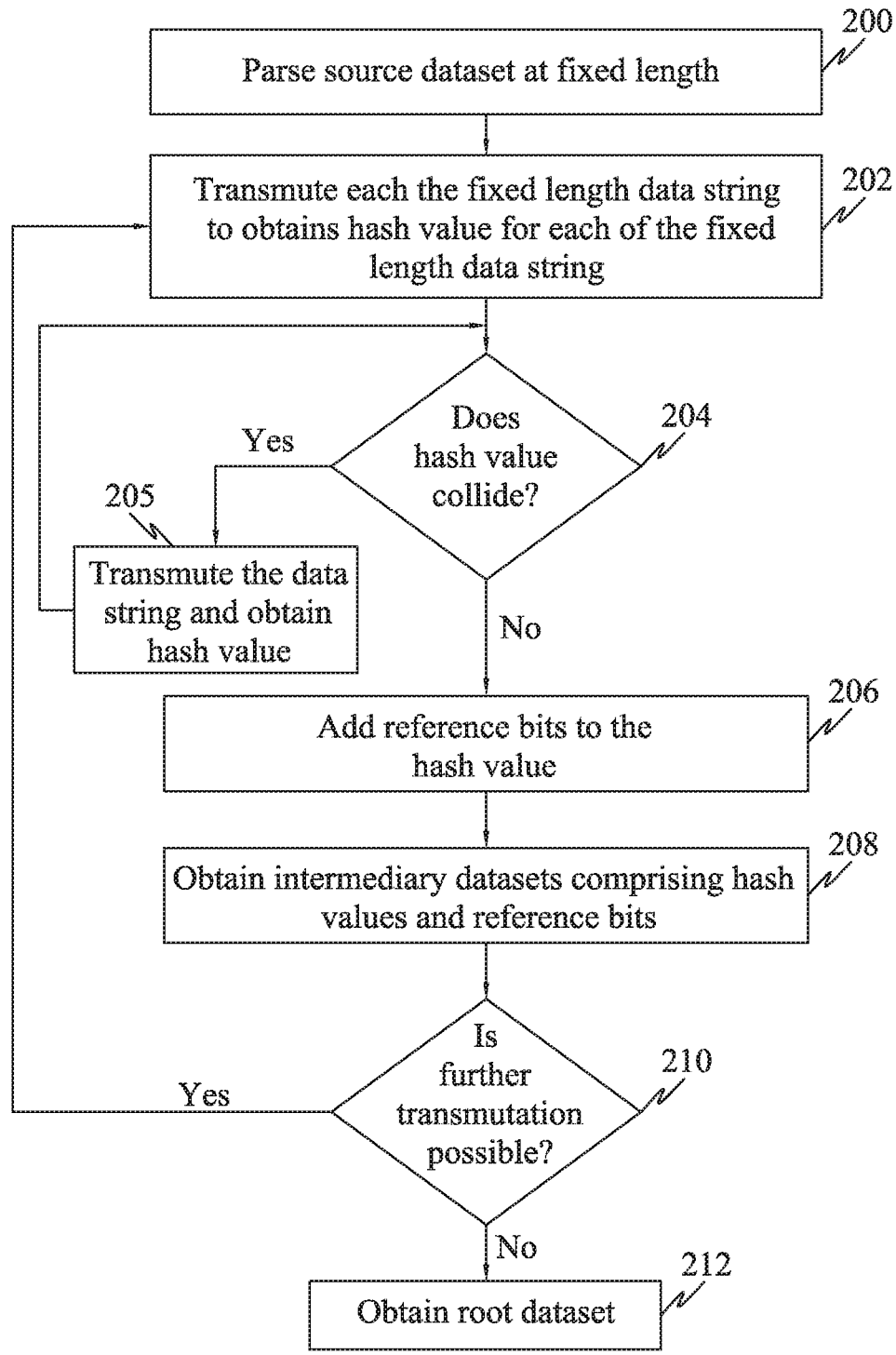
FIG. 2 is a flowchart of an exemplary method of converting a source dataset 302 to a root dataset 312.
Figure 3:
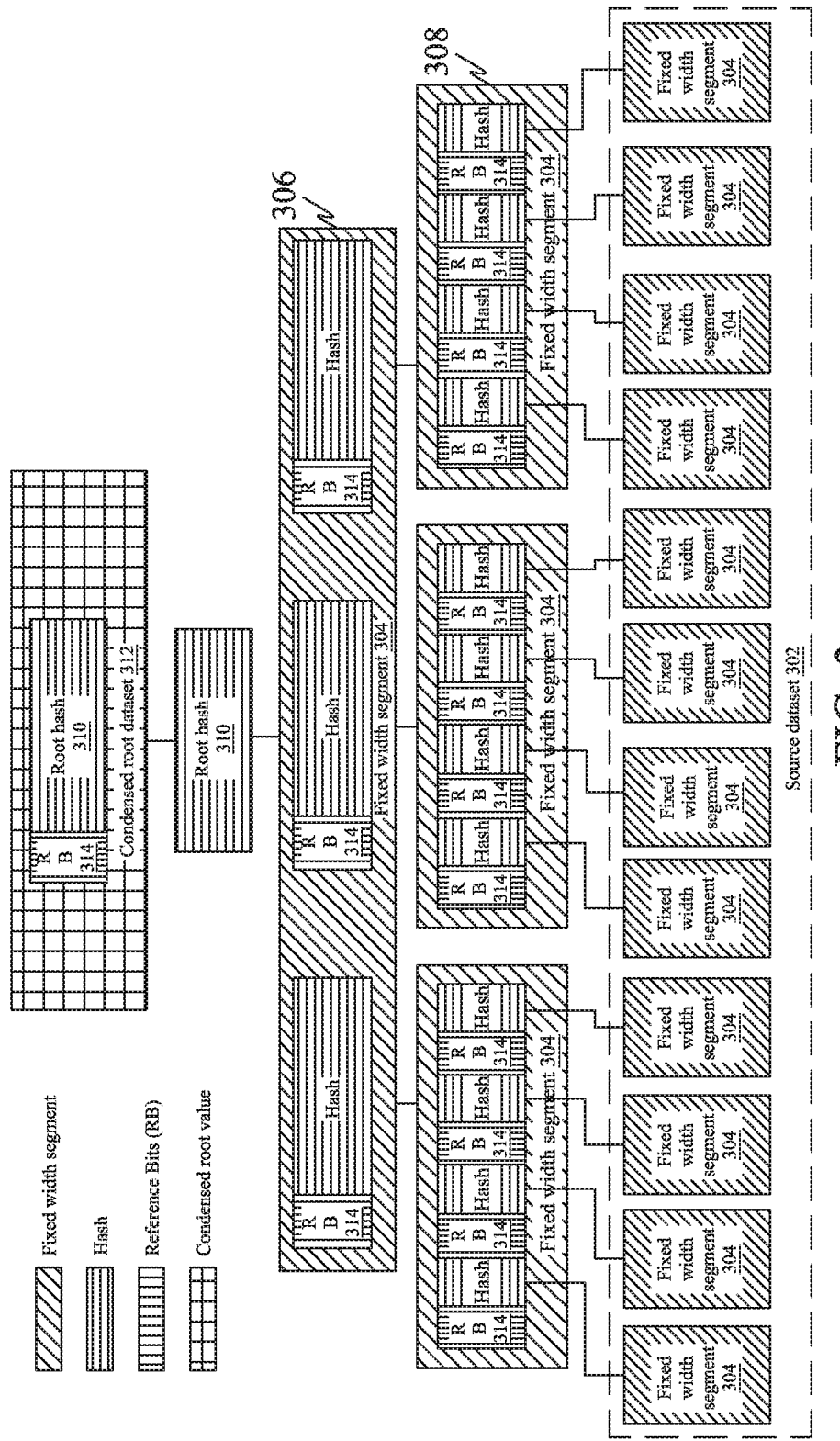
FIG. 3 is an illustration of the exemplary process of converting the source dataset 302 to the root dataset 312 by obtaining a plurality of intermediary datasets (306, 308)

Referring to FIGS. 2 and 3, the processor 102 executes a series of steps for converting the source dataset 302 to the root dataset 312. At step 200, the processor 102 parses the source dataset 302 at fixed length. At step 202, each data string 304 of fixed length is transmuted to obtain hash value for each of the fixed length data strings 304. At step 204, the processor 102 verifies, for each of the hash value, whether it results in collision. In case the hash value collides, then the data string 304 is again transmuted to obtain a non-colliding hash value (step 205). At step 206, reference bits (RB) 314 are added to each of the hash values. The reference bits 314 enable identification of a function which was be used to obtain the hash value. At step 208, intermediary dataset 306 comprising the hash values and the reference bits 314 are obtained. At step 210, the processor 102 determines whether further transmutation of the intermediary dataset 306 is possible. If it is determined that further transmutation is not possible (or not desired), then at step 212, the processor 102 may obtain the root dataset 312, which is the dataset which is not capable (or not desired) of further transmutation. The root dataset 312 also includes reference bits 314. The reference bits 314 of the root dataset 312 may also identify the number of intermediary datasets 306, 308 which have to be derived to derive the source dataset. If at step 210, the processor 102 determines that further transmutation of an intermediary dataset 306 is possible, then the process may return to step 202, with the respective intermediary dataset 306 as the input for transmutation.

The above recited steps will now be discussed in more detail. At step 200, the processor 102 parses the source dataset 302 at fixed length. In an embodiment, the source dataset 302 may be data or dataset that is represented in its original, native or raw format and structure. Examples of the source dataset 302 may include data that can be represented in binary format, such as, but not limited to documents, multimedia files, folders and directories, devices and virtual machines, among others. It shall be noted that, in one or more embodiments, the source dataset 302 may also be referred to as "dataset in first format" 302. Referring to FIG. 1 as well, the source dataset 302 may be present in the source system 101. The source dataset 302 may be parsed at fixed length (304). The parsing may be carried out by the processor 102 present in the source system 101. Hence, each of the data strings of fixed length 304 present in the source dataset 302 may be processed.

Referring to step 202, each data string of fixed length 304 is transmuted to obtain hash value for each of the fixed length data strings 304. The transmutation may be carried out by a transmutation module 104, which may be present in the source system 101. Transmutation may be carried out using hash functions. A hash value for a data string of fixed length 304 is obtained by processing the data string 304 using one of the hash functions. It is well known that conventionally collisions of hash values occur. However, embodiments address the possibility of such collisions using multiple hash functions, as will be explained in this description.

Referring to step 204, verification is performed to check whether a hash value that is generated by processing the data string 304 results in collision. The verification may be performed for each of the hash value that is generated. Conventionally, collision is said to occur when the same hash value represents two different data strings 304. However, in the embodiments of the current disclosure, collision is said to occur only when two identical hash values, which are generated using the same hash function represents two different data strings 304. In other words, if there are two identical hash values, but generated using two different hash functions, then collision is not said to have occurred.

In an embodiment, the hash value that is obtained is checked for collision against values in a database (database is discussed later in this description). The database may comprise hash values, and for each hash value, data identifying the hash function that was used to generate the hash value and the data string represented by the hash value. Hence, verification of collision involves checking whether an identical combination of hash value and hash function exists in the database, and whether this identical combination in the database represents an identical data string or not. In case identical combination exists in the database, but that combination in the database represents a different data string 304, then collision is said to have occurred. On the other hand, if identical combination exists in the database, but that combination in the database represents the same data string, then collision is not said to have occurred. It may be noted that, such a collision may be referred to as hash value collision to improve readability, instead of referring to it as collision of combination of hash value and hash function.

In an embodiment, a verification module 108, which may be present in the source system 101, may communicate the hash value and the corresponding hash function to a module associated with the database, to check for collision. In an implementation, only when identical combination exists in the database, a verification is made to check whether the data strings are identical or not, which may again be communicated by or to the verification module 108.

Referring to step 205, in case the hash value collides, then the data string 304 is again transmuted to obtain a non-colliding hash value. The processor 102 may be configured to choose a hash function (among the plurality of functions), which is different from the hash function that resulted in collision, to obtain a hash value. The hash value is again checked for collision, as explained earlier. The process of transmuting the data string 304 may be repeated using different hash functions till a non-colliding hash value and hash function combination is obtained.

In an embodiment, only a limited number of attempts may be made to obtain a non-colliding hash value, after which the data string 304 may be subjected to transmuting when it becomes part of another dataset (ex. intermediary dataset 308). Therefore, a part (one or more fixed width data strings 304) of the intermediary dataset of a higher order 306 may be included in the intermediary dataset of an immediate lower order 308, during the process of converting the source dataset 302 to the root dataset 312. The part may be subjected to transmutation while transmuting fixed width data strings in the intermediary dataset 308 of an immediate lower order.

The usage of multiple hash functions may mitigate the risk of collision to a substantial extent. These hash functions may be referred to as "hierarchical hash functions".

In an embodiment, once a hash value is identified as being colliding, the non-colliding hash value may be generated by a system or module associated with the database, and communicated to the source system 101. In an alternate embodiment, the non-colliding hash value may be generated by the source system 101.

In an embodiment, data string 304 corresponding to each of unique hash values is unique.

In an embodiment, each of the unique hash values is associated with one corresponding data string compared to all unique hash values used for converting the source dataset 302 to the root dataset 312. In other words, each hash value may be unique to the data string 304 it corresponds to as compared to other hash values computed during conversion of a source dataset 302 to a root data set 312.

In yet another embodiment, each of the unique hash values computed using a function is associated with one corresponding string compared to the unique hash values computed using the same function and committed by the system to the database for use at present and future. A combination of a hash value and a hash function using which the hash value was computed may be unique to a data string the hash value corresponds to. Each of the intermediary datasets (306, 308) comprises one or more hash values, wherein combination of each unique hash value and function using which the hash value is obtained, is unique to a data string 304 to which that combination corresponds to.

Referring to step 206, reference bits 314 are added to each of the hash values. The reference bits 314 enable identification of a function which should be used to obtain hash value that represents a data string 304. In an embodiment, reference bits 314 may be added to the data string 304 for which hash value was not obtained (as discussed earlier). The reference bits 314 may be of variable length. The instant reference bits 314 may indicate the failure to obtain a non-colliding hash value. Reference bits 314 may include function identifier bits. The reference bits 314 may also be referred to as "reserved value strings" 314 in one or more embodiments. In FIG. 3, the reference bits 314 are prepended to the hash values. However, the reference bits 314 or the reserved value strings 314 may be appended, prepended or interleaved to the corresponding hash values.

In an embodiment, reference bits 314 includes function identifier bits 314a among other information. Function identifier bits 314a enable identification of a function that should be used to obtain a dataset (ex. source dataset 302) from which the intermediary dataset 306 comprising the reference bits 314 was obtained in the process of converting the source dataset 302 to the root dataset 312. The function identifier bits 314a may be subset of the reference bits 314.

Reference bits 314 may further indicate presence of authentication flag. One or more bits included in the reference bits 314 may denote presence of authentication flag. A system (client system) where reconstruction may take place may be required to know which of the bits in the reference bits 314 denote the presence of flag bits for successful authentication of the system (client system). For a dataset (source dataset 302) to be reconstructed using the root dataset 312, a system may have to enter authentication keys for authentication. Requirement of authentication keys may be denoted/indicated by the authentication flag bits. Authorized client systems may have information corresponding to the authentication bits, such as, the position of the authentication flag bits indicated by the reference bits 314.

In an embodiment, garbage strings may be added to one or more intermediary datasets 306, 308 for security or for the purposes of transmuting. One or more bits of the reference bits 314 may indicate the presence of garbage string bits.

In another embodiment, reference bits 314 may further include information corresponding to additional bits which may be padded to datasets or the source dataset 302 as the case may be, when the length of the dataset is shorter than the length of the hash values derived from transmutation of the datasets or shorter than the fixed width required for transmutation. Under such a scenario, bits may be added in order to make the width of the data string equal to the fixed width required for transmutation. Information corresponding to the locations and size of such padding strings may be indicated by the reference bits 314.

In another embodiment, one or more bits representing information required for reconstruction or security may be included in the reference bits 314.

In an embodiment, one or more bits of the reference bits 314 of the root dataset 312 may include information corresponding to version of the source dataset 302. A dataset may undergo edits, due to which versions of dataset may be available. In such a scenario, the root dataset 312 of a previous version and the root dataset 312 of a current version may be concatenated and transmuted to obtain a root dataset, which has an indication of the version. Hence, the root dataset so obtained can be used to reconstruct different or desired version(s) of the dataset.

In an embodiment, the structure(s) and template(s) of the reference bits/string 314 may be defined in client system(s) that is transmuting/reconstructing. The structure(s) and template(s) may also be user-defined. Further, the structure(s) and template(s) may be specific to a source dataset that is being transmuted. Alternatively, the structure(s) and template(s) may be specified for all the source datasets that will be transmuted/reconstructed by the client system. Hence, even of a master database (which may be accessible to several client systems) is used for transmutation and reconstruction, the security of the data is enhanced since the structure(s) and template(s) of reference bits 314 that add context to data strings is defined in the system that transmutes/reconstructs the data.

In an embodiment, the structure(s) and template(s) of the reference bits/string 314 may be a pre-configured setting, which may be customized based on requirement of the user.

Referring to step 208, intermediary dataset 306 comprising the hash values and the reference bits 314 are obtained. Hence, the intermediary dataset 306 comprises reference bits 314, wherein the reference bits 314 enable identification of at least one function that should be used to obtain a dataset (ex. source dataset 302) from which the intermediary dataset 306 comprising the reference bits 314 was obtained in the process of converting the source dataset 302 to the root dataset 312.

Referring to step 210, the processor 102 determines whether further transmutation of the intermediary dataset 306 is possible. As an example, transmutation of intermediary dataset of higher order 306 may result in intermediary dataset 308 of a lower order. Typically, transmutation of the intermediary dataset 306 is possible if the length of the intermediary dataset 306 is greater than the length of hash value. In some embodiments, transmutation of the intermediary dataset 306 may not be possible even though the length of the intermediary dataset 306 is greater than the length of the hash value, when repeated preconfigured number of attempts to transmute, results only in collisions or it is determined that the hash value cannot be derived or is not available for the data string of the intermediary dataset.

Referring to step 212, if it is determined that further transmutation is not possible, then the processor 102 may obtain the root dataset 312, which is the dataset which is not capable (or not desired) of further transmutation. The root dataset 312 also includes reference bits 314. The reference bits 314 of the root dataset 312 may also identify the number of intermediary datasets 306, 308 which have to be derived to derive the source dataset. The root dataset 312 may include a root value 310, which may be referred to as final hash. The root value is the hash value obtained from transmutation of an immediate higher order intermediary dataset (308 in this case). A set of reference bits 314 may be added to the root value (hash value) 310. The set of reference bits 314 enable identification of a function that should be used to obtain at least an immediate intermediary dataset of higher order (308) from which the root value 310 was obtained in the process of converting the source dataset 302 to the root dataset 312. The set of reference bits 314 may further enable identification of a number or count of intermediary datasets (ex. 308 and 306 in this example) which have to be derived to obtain the source dataset 302 from the root dataset 312. The root dataset 312 may also be referred to as "condensed root value" or "condensed root dataset" in one or more embodiments. The root dataset 312 may be the representation of the dataset in the first format 302 in a transmuted form or a form that lacks semantics with respect to the source dataset 302. The root dataset 312 may be said to be in the form of mutating/mutable dataset and may be referred to as mutating/mutable object in one or more embodiments. The root dataset 312 may be referred to as dataset in a second format in one or more embodiments.

In an embodiment, if it is determined that further transmutation of the intermediary dataset 306 is possible then the process may return to step 202, with the intermediary dataset 306 as the input for transmutation. Transmutation of the intermediary dataset 306 may result in intermediary dataset 308. Intermediary dataset 306 may be referred to as an intermediary dataset of higher order with respect to the intermediary dataset 308. The dataset 306 may be of a larger width/length than the dataset 308.

In an embodiment, checksum based validation is carried out to ensure data integrity.

IV. PROTECTION OF DATA

Previously, the technique of converting source dataset to root dataset was discussed. Protection of the root dataset, and thereby the source dataset, will be discussed now.

In light of the foregoing description, it is evident that the reference bits 314 included in the intermediary datasets 306, 308 and root dataset 312 enable addition of semantics to the hash values present in each one of them. Hence, by protecting the root dataset 312, or at least the reference bits 314 of the root dataset 312, from unauthorized access, unauthorized re-construction of the source dataset 302 is prevented.

In an embodiment, the system 100 may be configured to protect the root dataset 312 by way of one or more authentication systems 110, which may be referred to as first authentication system. The authentication system 110 may be discrete and remotely located from the source system 101, or may have a distributed arrangement. In an embodiment, reference bits 314 of the root dataset 312 and hash value of the root dataset 312 may be protected by separate authentication systems. Semantics may be stripped off the root dataset 312 by separating the reference bits 314 from the hash value.

Figure 4A:
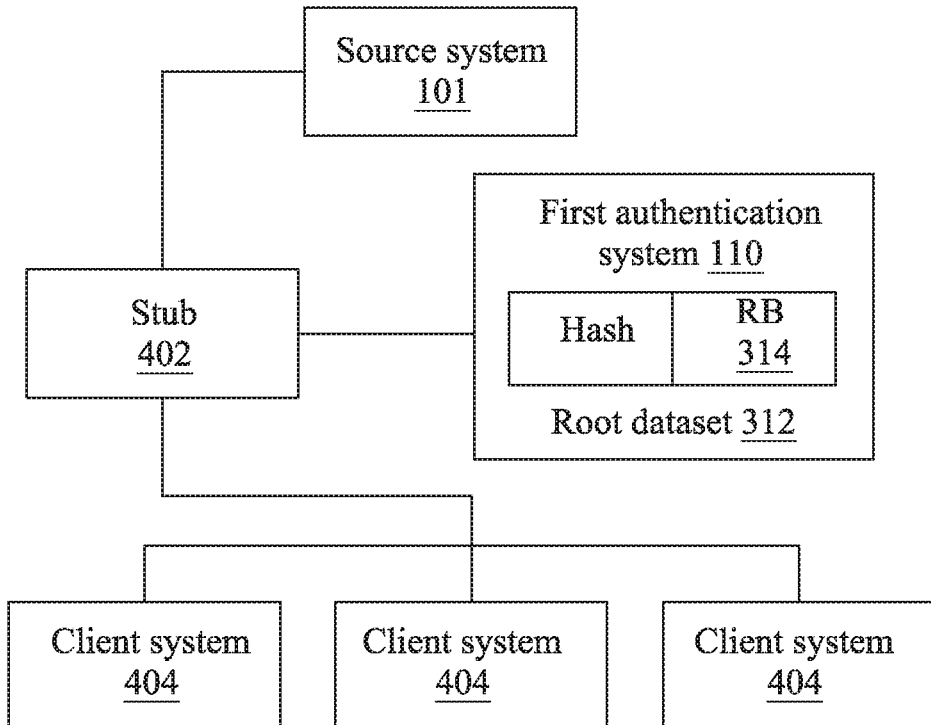
FIG. 4A illustrates an exemplary technique of protecting the root dataset 312 using a first authentication system 110.

In an embodiment, access to the root dataset 312 may be initiated by activating a stub. Referring to FIG. 4A, the system 100 may generate a stub 402 to enable access to the root dataset 312. As an example, the stub 402 may be initially available in the source system 101. The stub 402 may be circulated to other entities 404 or may be made available over a cloud infrastructure. The stub 402 may be configured in such a way that activation of the stub 402 may enable retrieval of the root dataset 312 after successful authentication of the entity 404 trying to access the root dataset 312. The stub 402 may point to (location, as an example, in the source system 101) the root dataset 312 protected by the authentication system 110.

Figure 4B:
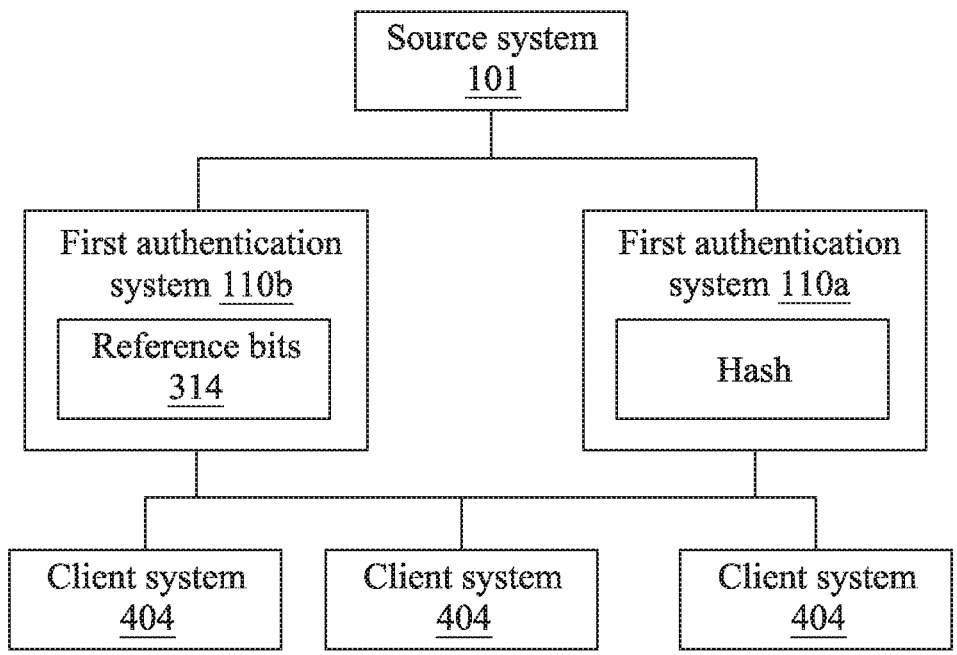
FIG. 4B illustrates yet another exemplary technique of protecting the root dataset 312 using multiple first authentication system 110a, 110b.

Referring to FIG. 4B, in an alternate embodiment, the hash value of the root dataset 312 may be protected by an authentication system 110a, while the reference bits 314 of the root dataset 312 may be protected by another authentication system 110b. The activation of the stub 402 may initiate retrieval of the reference bits 314 from a location separate from a location where the hash value is stored. Further, as is evident, the current implementation requires successful authentication by the authentication system 110a and authentication system 110b to gain access to the root dataset 312. The authentication required by authentication system 110b may be more stringent compared to the authentication required by authentication system 110a.

In an embodiment, activation of stub 402 may enable retrieval of the hash value of the root dataset 312 without requiring authentication. However, the hash value lacks semantics with respect to the source dataset 302 as reference bits 314 are separated from the hash value. Hence, retrieval of the hash value alone may not enable an entity 404 to reconstruct the source dataset 302 from the hash value of the root dataset 312. To be able to reconstruct the source dataset 302 from the root dataset 312, the reference bits 314 that add semantics to the hash value of the root dataset 312 have to be retrieved from the authentication system as well. The authentication system may require the entity 404 who seeks to retrieve the reference bits 314 of the root dataset 312 to be successfully authenticated.

In an embodiment, the root dataset 312, or any part thereof, such as reference bits 314, may be converted into human readable string. The human readable string may be taken off from electronic medium, thereby further securing the data as a whole. The human readable string may be used to initiate the source data 302 re-construction process.

In an embodiment, the database comprises hash values present in the intermediary and root datasets, which may be accessible even without authentication. However, the hash values may be stored in a format that lacks semantics with respect to the source dataset 302. The semantics of the hash values with respect to the source dataset originates from the reference bits 314 of the root dataset 312.

In an embodiment, the root dataset 312 may be stored in cloud infrastructure, and may be made accessible upon successful authentication. Such a configuration enables data to be protected even if security of a system that initially had the source dataset is compromised, or the system is lost or fails to function adequately.

In an embodiment, the root dataset 312 may enable secure (and essentially irretrievable) deletion of data, without need for and the use of encryption, encryption keys, or mechanical methods of data destruction such as degaussing and physical destruction of the medium. The system 100 enables secure deletion of data by shredding the reference bits 314 of the root datasets or the whole of the root datasets.

In an embodiment, checksum based validation is carried out to ensure data integrity.

V. RECONSTRUCTION OF SOURCE DATASET

Previously, the technique of converting source dataset to root dataset, and protecting the root dataset was discussed. Reconstruction of the source dataset 302 from the root dataset 312 will be discussed now.

In an embodiment, reconstruction of the source dataset 302 from the root dataset 312 may take place on the source system 101. Alternatively, construction of the source dataset 302 from the root dataset 312 may take place on one or more client systems 404. An authorized system may obtain the root dataset 312, which comprises the hash value and reference bits 314, using which the source dataset 312 is reconstructed.

Figure 5:
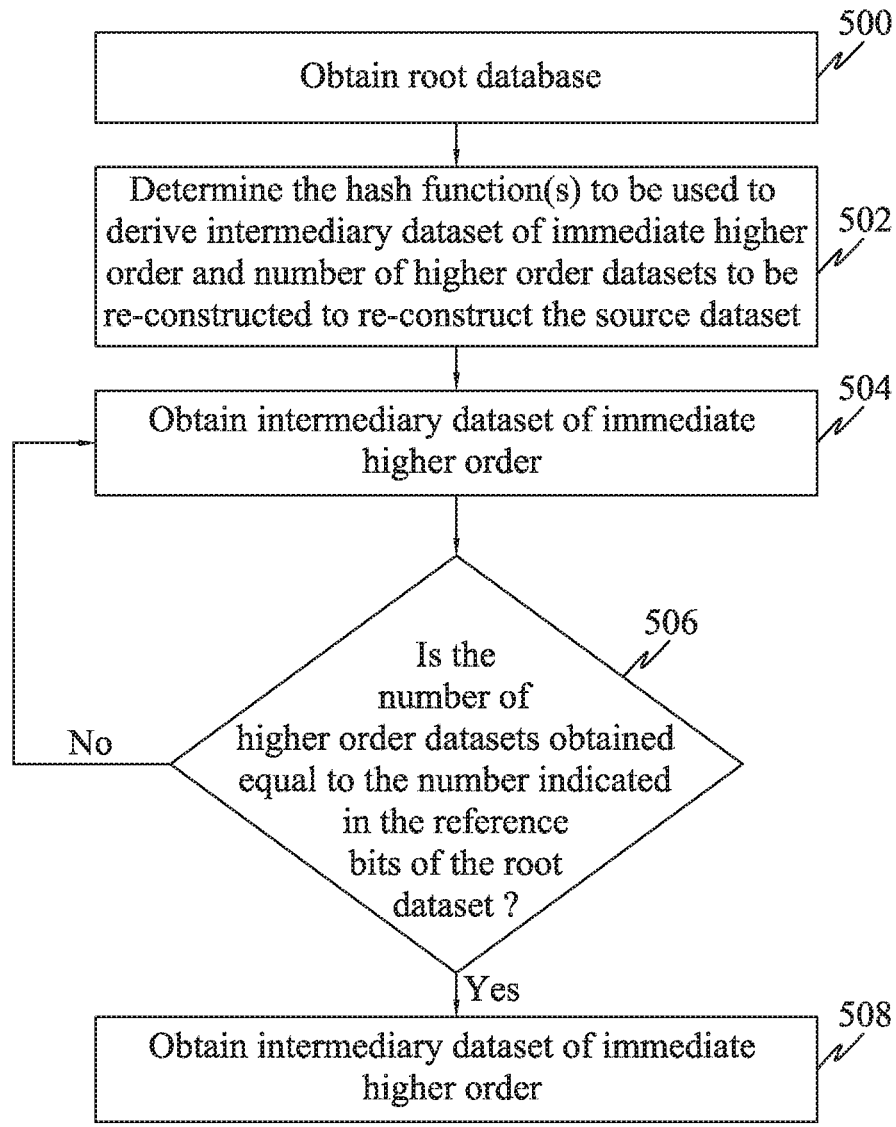
FIG. 5 is a flowchart of an exemplary method of reconstructing the source dataset 302 from the root dataset 312.

Referring to FIG. 5, a series of steps may be executed in order to reconstruct the source dataset 302 from the root dataset 312. At step 500, the root dataset 312 is obtained from one or more authentication systems 110. At step 502, reference bits 314 of the root dataset 312 is used for determining the function(s) to be used for deriving intermediary dataset of immediate higher order (ex. intermediary dataset 308) and number (ex. the number is 3 in FIG. 3) of higher order datasets to be re-constructed to re-construct the source dataset 302. At step 504, the intermediary dataset 308 of immediate higher order is obtained. At step 506, it is determined whether the number of orders of datasets so far obtained/re-constructed is equal to the number indicated in the reference bits 314 of the root dataset 312. If it is determined that number of orders of datasets obtained is equal to the number indicated in the reference bits 314 of the root dataset 312, then at step 508, the last obtained dataset is considered as the source dataset 302. If it is determined that number of datasets obtained is not equal to the number indicated in the reference bits 314 of the root dataset 312, then the process may return to step 504.

Referring to step 500, the root dataset 312 is obtained. The root dataset 312 may be obtained from one or more authentication systems 110, as discussed earlier. Further, as discussed earlier, the root dataset 312 comprises one hash value (in ideal situations) and reference bits 314.

Referring to step 502, the reference bits 314 of the root dataset 312 is used for determining the function(s) to be used for deriving intermediary dataset of immediate higher order (ex. intermediary dataset 308) and number (ex. the number is 3 in FIG. 3) of higher order datasets to be re-constructed to re-construct the source dataset 302. In other words, reference bits 314 of the root dataset 312 enable identification of the number of intermediary datasets (306, 308) to be derived to reconstruct the source dataset 302 from the root dataset 312. It shall be appreciated that, without knowing this number, the system would not know at which order of dataset reconstruction, the reconstruction process should stop.

Referring to step 504, intermediary dataset of immediate higher order is obtained by reverse transmutation. Reference bits 314 of the root dataset 302 indicates the function(s) to be used to obtain an intermediary dataset of immediate higher order (ex. 308) from the root dataset 312. The data identifying a function used for deriving the hash value 310 (root hash) may be used to obtain the data string represented by the hash value 310 derived by said function. The data string so obtained is the intermediary dataset of immediate higher order (ex. 308). The data identifying the function, or the function identifier, and the hash value may be used for querying the database 106, which may return the above mentioned data string. Hence, reconstruction of the source dataset 302 from the root dataset 312 may be enabled by means of a simple reverse look-up in the database 106, which comprises the hash values and their corresponding function identifier and data strings represented by them.

In an embodiment, during the process of reconstruction, for example, the order in which the data strings of fixed length are called from the master database 106 using hash values and function identifier bits 314a may be in a sequence other than the sequence in which data strings are to be arranged during reconstruction, wherein the sequence is defined by the system carrying out the reconstruction. Such a configuration addresses issues relating to systems that eavesdrop, thereby enhancing security. Likewise, in an embodiment, the order in which data is sent to the master database 106 during transmutation may be altered to enhance security.

In an embodiment, the root dataset 312 or any intermediary dataset, which is being reverse transmuted may comprise data strings that were not transmuted (during conversion of source dataset 302 to root dataset 312) in the higher order intermediary dataset, and were passed on to the lower order intermediary dataset. Such data string 304 may be carried over to the immediate higher order intermediary dataset, without reverse transmuting. Such data strings 304 may also be identified from the reference bits 314 associated with them.

Referring to step 506, it is determined whether the number of order of intermediary datasets obtained is equal to the number indicated in the reference bits 314 of the root dataset 312. The system where the reconstruction/reverse transmutation is taking place may be configured to determine whether the number of orders of datasets that are obtained in the process are equal in the number indicated by the reference bits 314 of the root dataset 312.

Referring to step 508, if it is determined that number of orders of datasets obtained is equal to the number indicated in the reference bits 314 of the root dataset 312, then the last obtained dataset is considered to be the source dataset 302. In other words, each intermediary dataset obtained may be further processed to obtain intermediary dataset of further higher order until the source dataset 302 is finally reconstructed.

In an embodiment, checksum based validation is carried out to ensure data integrity.

In an embodiment, the root dataset 312 may be communicated to or shared with authorized client systems such that client systems may be able to reconstruct the source dataset 302 from the root dataset 312. Transferring the root dataset 312 to client systems from the source system 101 may be referred to as abbreviated data transfer.

In an embodiment, the system may be used for online collaboration involving editing of dataset (source dataset as an example). The root dataset 312 of the source dataset 302 may be shared with the collaborators. Each collaborator's system may reconstruct the source dataset 302 using the root dataset 312. Each collaborator's system may share information corresponding to "range locks" (if editing is carried out) to a collaboration orchestration server, which in turn may share the information with the rest of the collaborators' systems. The data string in the edited range may again be converted into a root dataset by the system that carried out the edit, wherein the root dataset of said range is communicated to the collaboration orchestration server, which in turn may share the root dataset for said range with the rest of the collaborators' systems, where the collaborators' systems reconstruct the range using the root dataset of said range.

In an embodiment, the root dataset 312 may be programmed such that failure in a source system 101 or client systems including failure related to boot sectors or Operating System related failure may be recovered using the root dataset 312.

In an additional embodiment, root dataset 312 may be shared between multiple devices (client devices). Using the root dataset 312 messages may be exchanged among the devices. In other words, the root dataset 312 shared among multiple devices enables the devices to reconstruct the source dataset 302 on the devices.

In another embodiment, the root value may be shared with one or more devices (for example, client devices) using proximity sensing.

In an embodiment, checksum based validation is carried out to ensure data integrity.

VI. MASTER DATABASE

Figure 6:
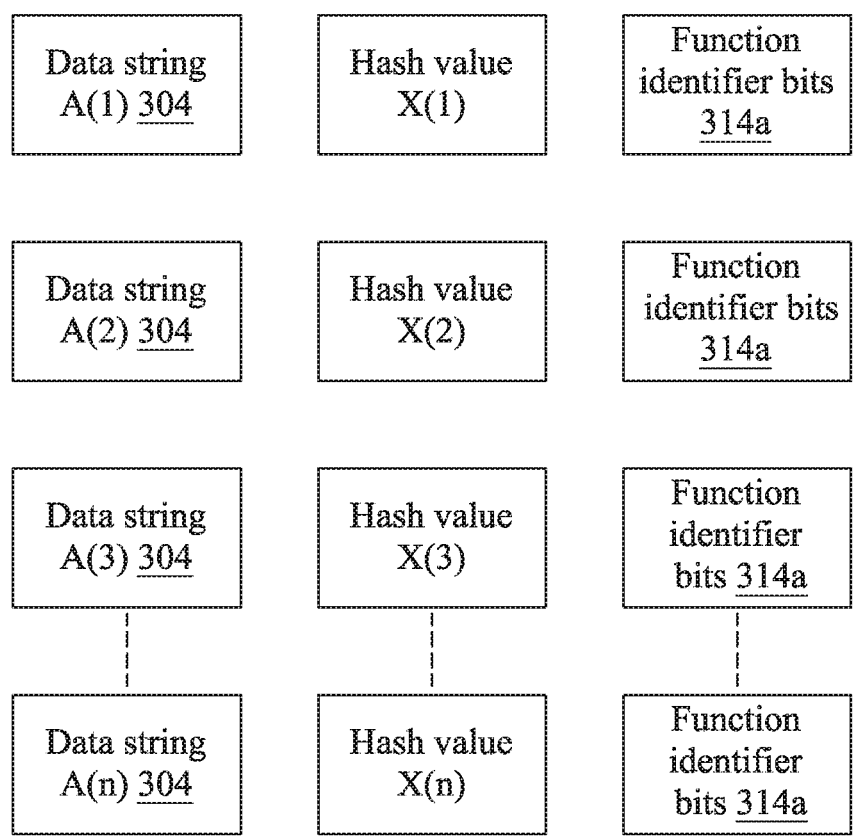
FIG. 6 is an illustration of an exemplary master database 106.

The database 106, which may be referred to as master database 106 was previously discussed briefly. The master database 106 will be discussed in detail now. Referring to FIG. 6, the database 106, as mentioned earlier, may store a plurality of hash values, and for each hash value, corresponding data string 304 and data identifying function bits 314a that identifies the function that was used for obtaining the hash value from the data string 304.

Figure 7:
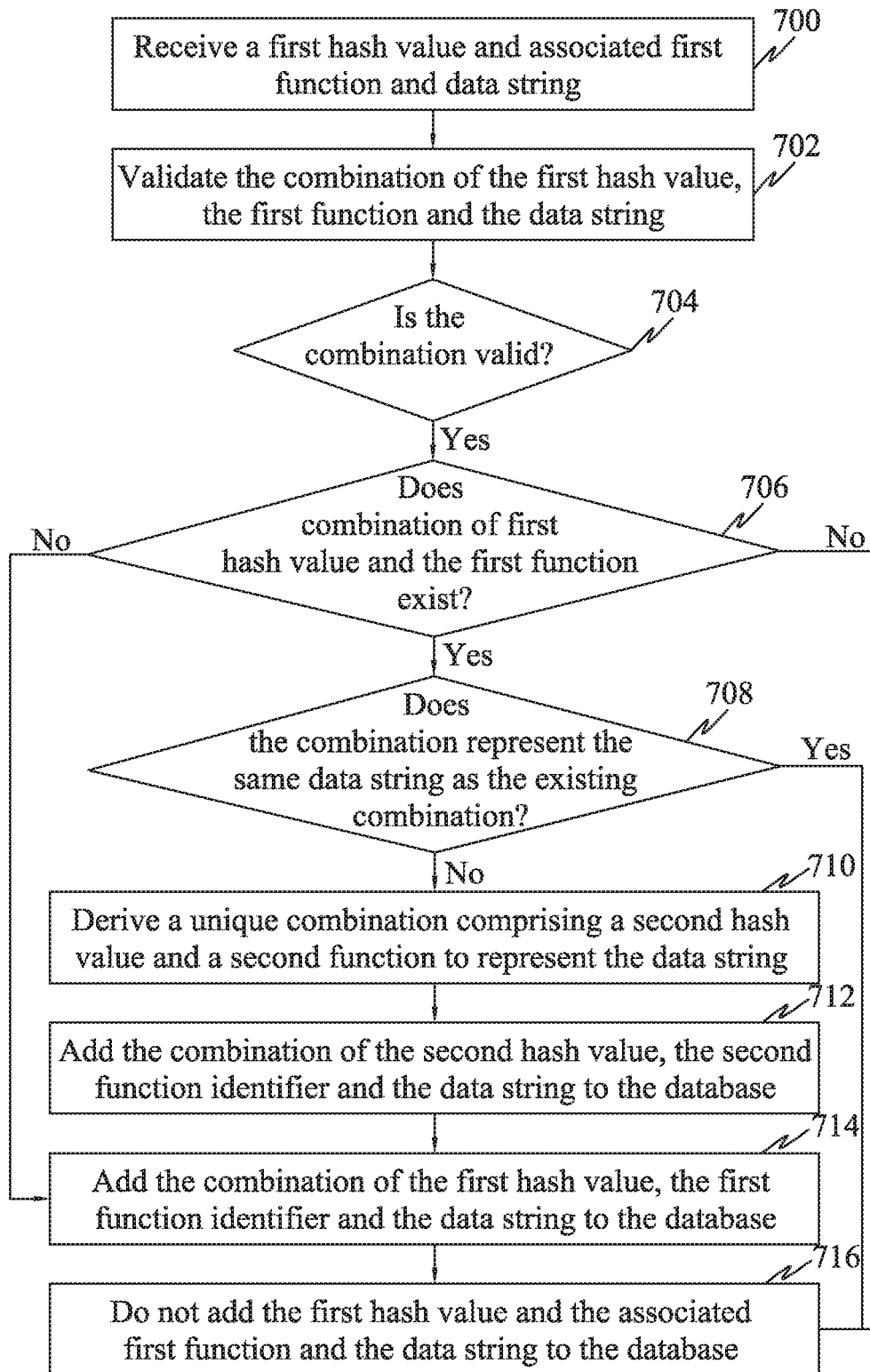
FIG. 7 is a flowchart of an exemplary method of updating the master database 106.

The master database 106 may grow over time with the addition of hash values, data strings 304 and hash function identifiers 314a. The additions are made, while ensuring that hash value collisions (discussed earlier) are addressed. Referring to FIG. 7, the method of updating the master database 106 is discussed. At step 700, a first hash value and associated first function and data string 304 are received by the master database 106. At step 702, the combination of the first hash value, the first function and the data string 304 is validated. Validation might be to ensure that the master database 106 is not corrupted by erroneous entries. At step 704, it is determined whether the combination is valid. If the combination is invalid, then the system 100 refrains (step 716) from adding the combination to the master database 106. If it is determined that the combination is valid, then at step 706, the master database 106 may be checked to verify whether the combination of first hash value and the first function already exists in the master database 106. If the combination of first hash value and the first function does not exist in the master database 106, then at step 714, the combination of the first hash value, the first function identifier and the data string 304 is added to the database 106. On the other hand, if the combination of first hash value and the first function already exists in the database 106, then at step 708, it is determined whether the combination represent the same data string 304 as the existing combination. If it is determined that the combination represents the same data string 304 as an existing combination, the system 100 refrains (step 716) from adding the combination to the database 106. On the other hand, if it is determined that the combination represents a data string 304 which is different from the data string 304 represented by the existing combination, then at step 712, a unique combination comprising a second hash value and a second function that represents the data string 304, is derived. At step 712, the system 100 adds the combination of the second hash value, the second function identifier and the data string 304 to the database 106.

The steps illustrated in FIG. 7 will be discussed in detail now. Referring to step 700, as discussed earlier, in the process of conversion of the source dataset 302 to the root dataset 312, hash values are obtained for each fixed length data strings 304 using hash functions. Reference bits 314 or hash function identifier bits 314a are added to each hash value, wherein the hash function identifier bits 314a identify the hash function that was used to compute hash value for the fixed length data string 304. During the transmutation process, the master database 106 may be configured to receive the hash value, and the associated hash function identifier bit 314a and the data string 304 which the hash value represents. The database 106 may grow as the hash values and associated functions and data strings 304 are being received and added to the database 106. The hash values and associated functions and data strings 304 may be added to the database 106, based on one or more predefined criteria, which will be discussed in the following embodiments.

Referring to steps 702 and 704, the master database 106 may be protected from erroneous entries via the second authentication or validation system 112. Validation may include determining if a hash value (may be referred to as a first hash value), the data string 304 corresponding to the first hash value and the data identifying the function (may be referred to as first function) using which the first hash value is obtained correlate. In other words, if a combination is received, it may be checked whether the hash function identified by the function identifier bit 314a would yield the hash value as received if applied on the received data string 304. The second authentication or validation system 112, in an embodiment, may additionally or alternatively, authenticate the system that sent the combination. Such validation may be required since the master database 106 may function as an open directory, with which systems may communicate without requiring authentication.

In an embodiment, the data strings, hash values and function identifier bits 314a may be arranged in the master database 106 in a manner which is independent of the sequence in which the datasets are extracted from the source dataset 302 while converting the source dataset 302 into the root dataset 312. The second authentication system 112 may enable protection of the entries from unauthorized access trying to inject erroneous entries into the master database 106 thereby having an arrangement of the entries in a random sequence independent of the sequence in which they are extracted during transmutation.

Referring to step 716, in case the combination is not valid, then the data may not be added as a new entry to the database 106.

Referring to step 706, it is determined whether the currently received and validated combination of first hash value and the first function already exists in the database 106. The processor 102 of the system 100 may be configured to add to the database 106, the first hash value, data string 304 corresponding to the first hash value and data identifying the first function used for computing the first hash value, if the combination of the first hash value and the corresponding first function is not already present in the database 106 (step 714).

On the other hand, there may be instances, as the database grows in size, that a combination of the first hash value and the first hash function matches another combination already present in the database 106. Hence, a combination of first hash value and the first function and a corresponding data string 304 may have been added to the database 106 earlier, in which case the currently received and validated combination may match the combination which was added earlier. Such a combination may undergo step 708 and may be added to the database 106 or discarded by the system 100 based on a decision made at step 708.

Referring to step 708, up on detecting that a combination of the first hash value and the first hash function matches another combination already present in the database 106, the processor 102 may be configured to compare/check the data strings 304 corresponding to both the combinations. The combination of the first hash value, the first function identifier and the data string 304, are not added to the database 106 (716), if the combination represents the same data string 304 as the one present in the database 106.

Referring to step 710, there may be instances where a combination corresponds to a different data string 304. In such a scenario, the system 100 may derive a unique combination comprising a hash value (may be referred to as second hash value) and a different function (may be referred to as second function) to represent the data string 304.

As discussed earlier, the system 100 comprises a plurality of hash functions. The processor 102 may be configured to use a different hash function (second hash function) to be applied to the data string 304 to compute a second hash value. The uniqueness of the combination may be achieved by subjecting the combination through the steps 706 and 708 before it is added to the database 106 as a new entry (712). The combinations may be generated by the source system 101 or by a system dedicated to update the database 106.

In an embodiment, processor 102 is configured to add to the database 106, the second hash value, data string 304 corresponding to the first hash value and data identifying the second function (function identifier bits 314a), wherein the second function is used for computing the second hash value using the data string 304 corresponding to the first hash value. The second hash value is unique compared to unique hash values, which are computed using the second function, present in the database 106. The entries in the master database 106 may be referred to as immutable objects.

In an alternate embodiment, the system 100 may include multiple master databases 106 having data strings, plurality of hash values and function identifier bits 314a as entries. Data strings (304) stored in each of the plurality of master databases 106 may be of variable lengths/sizes.

VII. OPTIMIZATION OF THE MASTER DATABASE

The master database 106 may significantly grow in size and may even require time to achieve considerable growth. In an embodiment, the growth or the way the master database 106 is populated is optimized, which also optimizes space needed to store the master database 106. The database 106 may be optimized for storage space and bandwidth requirements during transmission.

Figure 8:
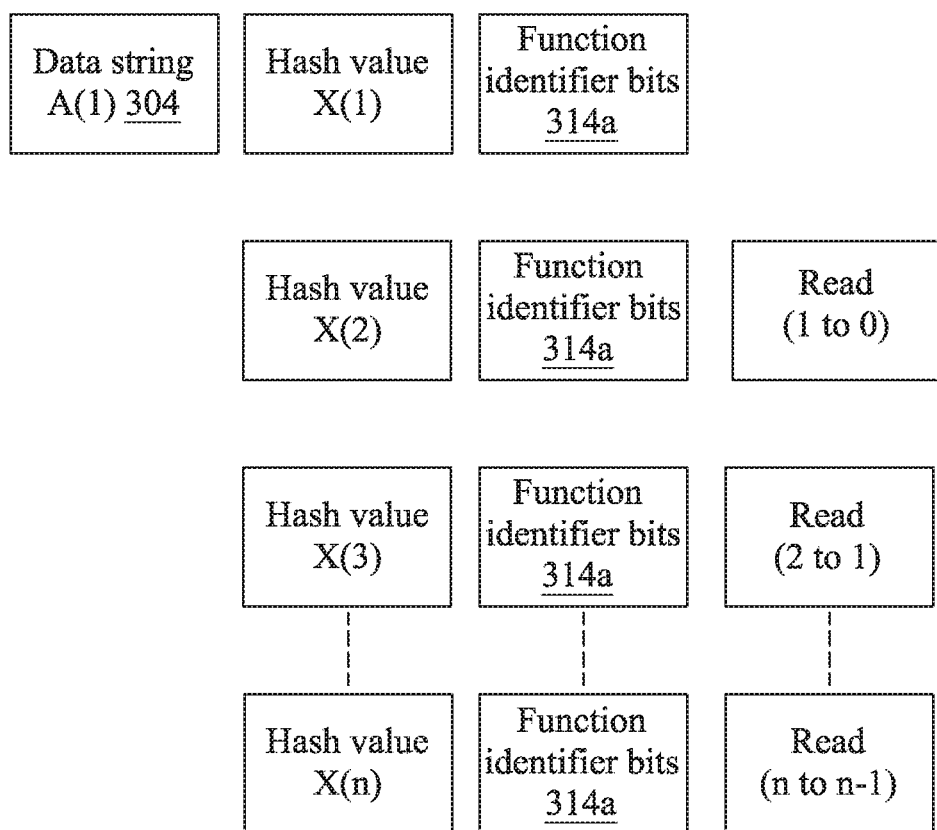
FIG. 8 is an illustration of an optimized master database 106.

Referring to FIG. 8, the system 100 may be configured to add to the database 106, a plurality of hash values derived based on a data string 304, which may be referred to as a source data string 304, present in the master database 106. A plurality of data string 304 may be derived from the source data string. As an example, if the source data string 304 has "n" bits, then additional "n−1" data strings 304 can be derived from the source data string 304. The source data string 304, from which the plurality of data strings 304 is derived, is a data string 304 represented by a hash value and function identifier.

In an embodiment, each derived data string 304 may be obtained by reading the source data string 304 by offsetting predefined bits in the source data string 304. In an example, each data string 304 may be derived from the source data string 304 by means of an incremental circular read function. For example, the source data string 304 comprises n-bits of data and the source data string 304 is read from the $0^{th}$ bit to the $n^{th}$ bit. The first derived data string 304 may be obtained from the source data string 304 by reading the source data string 304 from the $1^{th}$ bit of data to the $0^{th}$ bit of data. Likewise, the second derived data string 304 may be obtained from the source data string 304 by reading the source data string 304 from the $2^{th}$ bit of data to the $1^{th}$ bit of data. Similarly, the $n^{th}$ derived data string 304 may be obtained from the source data string 304 by reading the source data string 304 from the $n^{th}$ bit to the $(n-1)^{th}$ bit. Hence, the master database 106 is populated relatively quickly.

The system 100 may further compute hash value for each derived data strings 304 using hash functions. Even in this scenario, the uniqueness of the combination (as discussed earlier) is ensured. The hash value and the hash function identified representing each of the derived data strings 304 may be added to the master database 106, without adding the derived data string as an entry in the master database 106.

Instead, the system 100 may further add to the master database 106 an entry that indicates the sequence in which source data string 304 has to be read to obtain the derived data strings 304, thereby saving storage space.

The derived hash values that are added to the master database 106 are unique compared to the hash values already present in the database 106 that were obtained using a same function. The data strings 304 represented by the derived hash values that are added to the database 106 are unique compared to the data strings already present in the database 106.

In an embodiment, the data strings 304 may be stored in compressed form, with an identification of the decompression function to be used for obtaining the data string 304. The system 100 may be configured to communicate to a client system 404 the data string 304 in the compressed form along with the data identifying the decompression function to be used to obtain the data string 304. Alternatively, the system 100 may be configured to communicate to the client system 404, the data string 304 after decompression.

In another embodiment, for every entry in the master database 106, one or more computational equivalents or naturally (physical, mathematical or biological) occurring constants corresponding to the raw data string may be stored. Data strings may be associated with the universal constants. Further, data strings may be expressed as computational functions of universal constants, wherein every data string entry in the master database 106 is processed through an array of computational functions. Master database 106 stores the computational equivalents that represent the data strings.

In an embodiment, the master database 106 may be stored in more than one location to obtain redundancy, reduce latency and achieve other system efficiencies.

VIII. FIRST ALTERNATE CONFIGURATION OF DATABASE

In an embodiment, referring to FIG. 1, the system 100 includes a local database 118 in addition to the master database 106. The local database 118 may be present in the source system 101. The local database 118 may include cache of non-colliding hash values, function identifier and data strings 304, which are derived while converting the source dataset 302 to the root dataset 312. Hence, the local database 118 may be, in other words, a subset of the master database 106. The local database 118 may also be optimized by using compression, as discussed earlier with regards to the master database 106.

In an embodiment, the source system 101 may use the local database 118 to reconstruct the source dataset 302 from the root dataset 312 without querying the master database 106 or querying the master database 106 relatively fewer times. Such a configuration thereby enables reconstruction of source dataset 302 from the root dataset 312 in an offline mode and reduces the need for the source system 101 to communicate with a cloud storage system having the global database 106, over the internet.

IX. SECOND ALTERNATE CONFIGURATION OF DATABASE

In an embodiment, the master database 106 may be present in the source system and client systems 404. The source system may be the one that converts the source dataset 302 to the root dataset 312, and the client systems 404 are the ones may reconstruct the source dataset 302 using the root dataset 312. The master database 106 in these systems may be updated by way of software/system updates. In this configuration, the source system may convert the source dataset 302 to the root dataset 312 in offline mode. Further, the client systems 404 may reconstruct the source dataset 302 using the root dataset 312 upon receiving the root dataset 312. The reconstruction may be carried out in offline mode by means of reverse look-up in the master database 106.

X. THIRD ALTERNATE CONFIGURATION OF DATABASE

In yet another embodiment, a database may be built as the source dataset 302 is being transmuted to obtain the root dataset 312. The database may be built in the source system 101. Unlike the master database 106, the database in this embodiment may correspond to the source dataset 302 which is being currently transmuted. For a subsequent source dataset, a subsequent database that corresponds to that dataset may be built. The database that is built and the root dataset 312 may be used to reconstruct the source dataset 302.

XI. FOURTH ALTERNATE CONFIGURATION OF DATABASE

In an embodiment, the system 100 comprises a plurality of tables. Each table comprises fixed width data strings correlated or mapped to relatively shorter fixed width data strings (loosely comparable to hash values discussed earlier) using a function. However, in the instant embodiment, the function used for correlation is such that correlation does not result in collision (hence predictable), unlike typical hash functions, where collision is possible, but difficult to predict. Example of such a function may include arithmetic function. It shall be noted that, when lengthier fixed width data strings are correlated or mapped to relatively shorter fixed width strings, the shorter fixed width strings will be exhausted, leaving behind several lengthier fixed width data string unrepresented (orphaned). The orphaned fixed width data strings are correlated to shorter fixed width data strings in one or more additional tables, each table using a function that is similar to the above discussed function in trait (no collision/predictable) but resulting in correlation directed towards representing at least some of the orphaned data strings. The number of such database that may be required or present will depend on the difference in width of the lengthier and shorter fixed width data string, but, as would be evident to one ordinarily skilled in the art in light of this disclosure, the complete elimination of orphaned strings is neither possible nor desirable.

In an embodiment, the use of a larger number of tables would result in fewer iterations during transmutation and reconstruction, while the use of a single or fewer tables would necessitate a larger number of iterations during transmutation and reconstruction.

In an embodiment, a client system that is transmuting may include these tables or build these tables at the time of transmutation. Likewise, the client system that is reconstructing the source dataset may include these tables or build these tables at the time of reconstruction. The reference bits may identify the table(s) or the function(s) used to generate the table, which may be used during reconstruction of the source dataset.

In an embodiment, as would be clear from the foregoing description, multiple databases, directories or tables (may be referred to as directories) can be used for transmuting and reconstructing source dataset. It is also possible that the width of the data strings stored in one of the directories may be different from the width of the data strings stored in another directory or directories. Therefore, when such directories are used for transmutation and reconstruction, the width (which was previously referred to as fixed width data strings) of the data strings that are transmuted or reconstructed will depend on the directory used for transmutation and reconstruction. The reference bits 314 may provide information about the directories being used.

XI. FIFTH ALTERNATE CONFIGURATION OF DATABASE

In light of the foregoing disclosure, it will be clear that a database that is used for transmutation and reconstruction of data comprises data strings of longer width being represented by data strings of relatively shorter width. The representation is obtained by using functions, complex or simple, as discussed earlier. In an embodiment, data strings of longer width are populated in the database using biological data represented in binary format. One such example of the biological data is a DNA sequence. As an example *E. coli* K-12 MG1655 U00096.2 genome sequence, represented in binary format, may be used to populate the longer width data strings table of the database. The population of the database may be done using predefined logic. As an example, based on the width of the data string to be populated, the range of base pairs in the sequence to be considered may be defined. Further, the order in which the range of base pairs have to be shifted may also be defined. Furthermore, circular read (discussed earlier) of the binary data strings may be used in a defined fashion to populate the database. The shorter data strings that represent the longer data strings may be populated or determined based on defined functions (example: functions identified by function identifier bits 314*a*). The advantage of the current implementation is that, just by identifying the biological data (example *E. coli* K-12 MG1655 U00096.2 genome sequence) and the methodology adopted to build the database using the biological data, the database can be built as and when desired. As an example, even if the database is unavailable, for whatever reasons, the database can be built as long as the identification of the biological data (example *E. coli* K-12 MG1655 U00096.2 genome sequence) and the methodology adopted to build the database using the biological data are known. As another example, a system that wishes to reconstruct the source dataset can build the database that will be used for reconstruction, with the knowledge of the identity of the biological data (example *E. coli* K-12 MG1655 U00096.2 genome sequence) and the methodology adopted to build the database using the biological data, which may have been passed on by the system that carried out the transmutation, or by any other system with said knowledge. It may be noted that different genome sequence may be used to populate the database.

XIII. CONCLUSION

Embodiments enable converting, storing, managing, transmitting and retrieving of data.

Embodiments enable transmutation of an arbitrarily large source dataset into smaller root dataset of fixed length.

Embodiments enable reverse transmutation to obtain source dataset from root dataset.

Embodiments enable protection of the root dataset, thereby the source dataset, from unauthorized entities.

Embodiments enable substantial reduction in the storage space required to store data.

Embodiments enable substantial reduction in the bandwidth requirements for data transmission.

Embodiments enable data to be protected even if security of a system that initially had the source dataset is compromised.

Embodiments enable data to be protected even the system that initially had the source dataset is lost or fails to function adequately.

The processes described above is described as sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for managing data, the system comprising at least one processor configured to:
   receive a source dataset as an input by the processor;
   transmute, by the processor, the source dataset into an intermediate dataset, wherein the intermediate dataset comprises hash values obtained by transmuting data strings in the source dataset, and continue transmuting the immediate transmuted intermediate dataset to a subsequent intermediate dataset until obtaining a root dataset, wherein the system is configured to use one or more functions among a plurality of functions to obtain the intermediate datasets and the root dataset;
   create, by the processor, the root dataset comprising
   reference bits, wherein the reference bits enable identification of a function, among the plurality of functions, which is used to obtain at least the intermediary dataset of an immediate higher order from which the root dataset was obtained during the conversion of the source dataset to the root dataset, and the reference bits comprised in the root dataset enable identification of a number of intermediary datasets that must be derived to obtain the source dataset from the root dataset;
   re-construct, by the processor, the intermediate dataset of the immediate higher order from which the root dataset was obtained, using the function identified by the reference bits of the root dataset; and re-construct, by the processor, the source dataset by re-constructing the intermediate datasets based on the number of the intermediate datasets that is derived to obtain the source dataset from the root dataset, wherein the reference bits comprised in the root dataset enable identification of the number.

2. The system of claim 1, wherein the system is configured to store the root dataset in a system that is discrete from a source system that held the source dataset while converting the source dataset to the root dataset.

3. The system of claim 1, wherein the root dataset comprises one or more hash values obtained from the intermediary dataset of the higher order, wherein the one or more hash values lack semantics with respect to the source dataset in the absence of the reference bits that enable identification of the function and the number of intermediary datasets.

4. The system of claim 1, wherein the system is configured to provide a stub, wherein activation of the stub initiates authentication required for retrieval of the root dataset.

5. The system according to claim 1, wherein the intermediary datasets comprise a plurality of hash values, wherein the system is configured to construct the source dataset from the root dataset by retrieving data strings corresponding to the hash values.

6. The system according to claim 5, wherein data string corresponding to each of unique hash values are unique.

7. The system according to claim 1, wherein the root dataset is converted into a human readable string, wherein the root dataset is obtainable using the human readable string.

8. The system according to claim 1, wherein the intermediary datasets comprise a plurality of hash values, wherein the hash values and corresponding data strings are stored in a format that lack semantics with respect to the source dataset.

9. The system according to claim 8, wherein the system is configured to construct the source dataset by:
   retrieving the root dataset upon authentication; and
   retrieving data strings corresponding to the hash values at least based on the root dataset, wherein the reference bits of the root dataset enables addition of semantics to the retrieved data string with respect to the source dataset.

10. The system according to claim 9, wherein the hash values and corresponding data strings are stored in the format that lack semantics with respect to the source dataset in a system, which is discrete from a source system that comprises the source dataset during the conversion of the source dataset to the root dataset.

11. The system according to claim 8, wherein the hash values and corresponding data strings are stored in the format, which lack semantics with respect to the source dataset, in a source system that comprises the source dataset during the conversion of the source dataset to the root dataset.

12. The system according to claim 11, wherein a client system constructs the source dataset from the root dataset, wherein the client system receives the hash values and corresponding data strings from the source system.

* * * * *